United States Patent

Schulte

[11] Patent Number: 5,791,283
[45] Date of Patent: Aug. 11, 1998

[54] MILKING PLANT

[75] Inventor: Klaus Schulte, Mölnbo, Sweden

[73] Assignee: Alfa Laval Agri AB, Tumba, Sweden

[21] Appl. No.: 817,360

[22] PCT Filed: Oct. 6, 1995

[86] PCT No.: PCT/SE95/01150

§ 371 Date: May 27, 1997

§ 102(e) Date: May 27, 1997

[87] PCT Pub. No.: WO96/11567

PCT Pub. Date: Apr. 25, 1996

[30] Foreign Application Priority Data

Oct. 12, 1994 [SE] Sweden ............... 9403461

[51] Int. Cl.⁶ .............................. A01J 5/017; A01J 7/02
[52] U.S. Cl. .............................. 119/14.1; 119/520
[58] Field of Search .............. 119/14.03, 14.08, 119/14.1, 520

[56] References Cited

U.S. PATENT DOCUMENTS

| 2,512,094 | 6/1950 | Duncan | 119/520 X |
| 2,910,965 | 11/1959 | Cann, Sr. | 119/14.03 X |
| 3,385,265 | 5/1968 | Schrader | 119/14.18 |
| 4,034,713 | 7/1977 | Umbaugh | 119/14.18 X |
| 4,572,105 | 2/1986 | Chowdhury et al. | 119/14.18 |
| 5,167,201 | 12/1992 | Peles | 119/14.18 |
| 5,697,324 | 12/1997 | van der Lely | 119/14.08 |
| 5,713,301 | 2/1998 | van der Lely | 119/14.1 X |

FOREIGN PATENT DOCUMENTS 306579  3/1989  European Pat. Off. ........... 119/14.08

*Primary Examiner*—Robert P. Swiatek
*Attorney, Agent, or Firm*—Hovey, Williams, Timmons & Collins

[57] ABSTRACT

A milking plant comprises a stall adapted to house one animal at a time for milking of the animal and a device for automatic milking of the animal in the stall. According to the invention the automatic milking device comprises a first milking unit with teatcups and a second milking unit with teatcups and an attachment means adapted to attach the teatcups of either the first or the second milking unit onto the animal's teats. During milking, the milking unit which is not used for milking may be cleaned or serviced, in order to be prepared for the next animal to be milked.

16 Claims, 2 Drawing Sheets

MILKING PLANT

BACKGROUND OF THE INVENTION

1. Field of the Invention

The present invention relates to a milking plant comprising a stall adapted to house one animal at a time for milking of the animal, and a device for automatic milking of the animal in the stall.

2. Description of the Prior Art

EP-B1-452 381 discloses such a milking plant intended for automatic milking of loose housed cows at optional points of time. Since the known milking plant is relatively expensive it is important that it is efficiently utilized.

A problem of the known milking plant, however, is that it has to be regularly closed for necessary cleaning and service of said automatic milking device. Furthermore, directly after milking of an ill or medically treated cow, the known plant has to be closed for an extra cleaning of the automatic milking device, in order to avoid contamination of the milk extracted from the next cows which are milked. Since a cleaning interval can last for about 45 minutes the known milking plant is therefore not satisfactorily utilized.

The object of the present invention is to provide a milking plant of the kind described above, which can be utilized more efficiently as compared with the known milking plant.

SUMMARY OF THE INVENTION

This object is obtained by a milking plant of the kind initially stated, which is characterized in that said automatic milking device comprises a first milking unit with teatcups and a second milking unit with teatcups, and an attachment means adapted to attach the teatcups of either the first or the second milking unit to the animal's teats. As a result one milking unit can be used for milking of animals, while the other milking unit is subjected to some suitable treatment, such as service or cleaning. Consequently the utilization efficiency of the milking plant according to the invention is substantially improved, as compared with the known milking plant.

Cleaning means may suitably be adapted to clean milk passages in one of the milking units, while the teatcups of the other milking unit are available for said attachment means. Said cleaning means may comprise a cleaning device adapted to be connected to the teatcups of one of said milking units. As an alternative, said cleaning means may comprise two cleaning devices adapted to be connected to the teatcups of the first milking unit and the second milking unit, respectively, when required. Hereby, any one of the cleaning devices can be subjected to necessary service, while the other is used for cleaning of any one of the milking units, which contributes to the improvement of the utilization efficiency of the milking plant.

According to a preferred embodiment of the plant of the invention, a displacement means is adapted to displace the teatcups of the first milking unit and the second milking unit, respectively, between a milking position, in which the teatcups are available for said attachment means, and a stand-by position, in which the teatcups are not available for the attachment means. As an alternative the two teatcup clusters of the milking units may be placed in two different milking positions, respectively, and the attachment means be adapted to bring teatcups from and leave them in said two milking positions.

The displacement means may be adapted to simultaneously displace the teatcups of the first milking unit and the second milking unit such that the teatcups of the first milking unit are displaced from their stand-by position to their milking position, while the teatcups of the second milking unit are displaced from their milking position to their stand-by position, and vice versa. For example, the milking position and the stand-by position, respectively, for the teatcups of the first milking unit may be the same as the milking position and the stand-by position, respectively, for the teatcups of the second milking unit. In this case the displacement means may comprise a holding means which carries the teatcups of both the first and second milking units, the holding means being rotatable about a (suitably vertical) shaft for displacing the teatcups between the milking and stand-by positions.

Alternatively, the milking position for the teatcups of the first milking unit may be the same as the milking position for the teatcups of the second milking unit, whereas the stand-by positions for the teatcups of the first and second milking units are different. For example, the displacement means may comprise a holding means which carries the teatcups of both the first and second milking units, the holding means being movable back and forth for displacing the teatcups between the milking and stand-by positions.

Advantageously, cleaning means may be adapted to be connected to the teatcups of the first milking unit and the second milking unit, respectively, when the teatcups are in their stand-by position.

DESCRIPTION OF THE PREFERRED EMBODIMENTS

Figure 1:
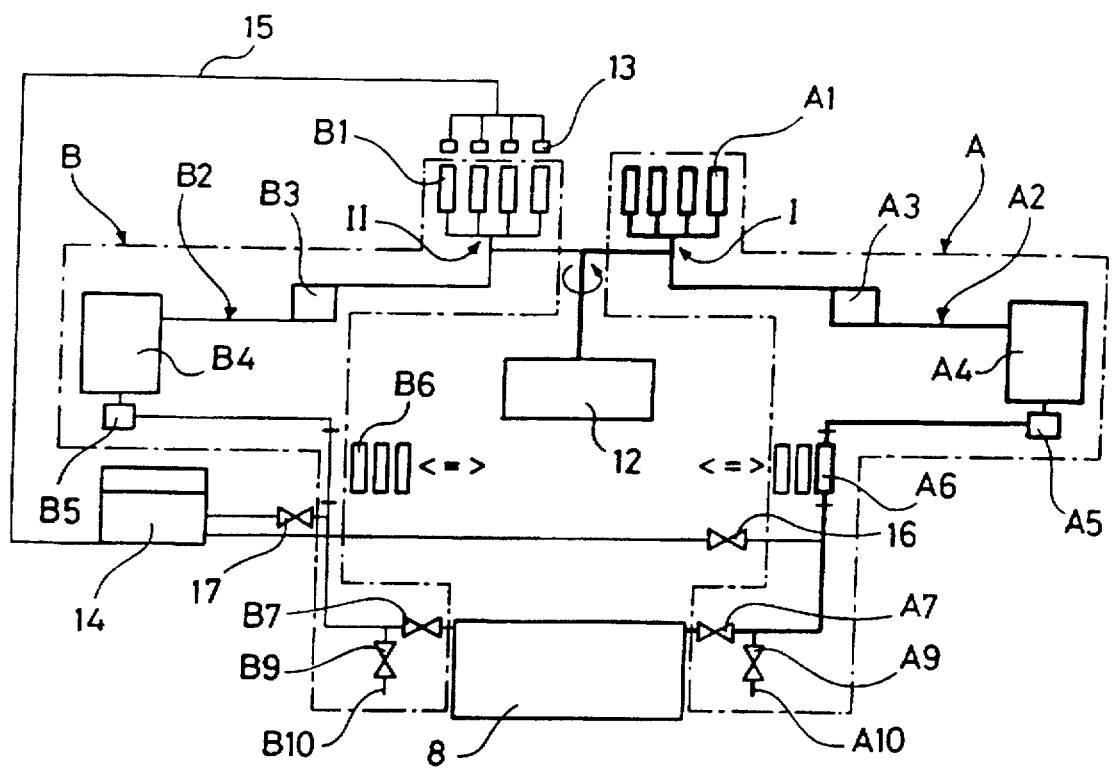
FIG. 1 is a schematic drawing showing a first embodiment of the milking plant according to the present invention.

In the figures, components which correspond to one another have been given the same reference numerals.

In FIG. 1 there is shown a milking plant according to the invention comprising a first milking unit A and a second milking unit B, which are adapted to milk independently of each other. The first milking unit A comprises four teatcups A1, and a milk conduit A2, which is connected to the teatcups A1. The milking unit A further comprises a flow meter A3, a receiver A4, a pump A5 and a milk filter A6, which are connected to the milk conduit A2 in said order, as seen in the milk flow direction. The milk filter A6 is automatically exchangeable for a new milk filter as indicated in FIG. 1. The second milking unit B comprises four teatcups B1, a milk conduit B2, a flow meter B3, a receiver B4, a pump B5 and a milk filter B6, which are connected to one another in the corresponding manner described above in connection with the first milking unit A. Downstream of the milk filters A6 and B6 the two milk conduits A2 and B2 are connected to a milk tank 8 via two valves A7 and B7 and connected to two drain conduits A10 and B10 via two drain valves A9 and B9.

A displacement means 12 is adapted to displace the teatcups A1 and the teatcups B1, respectively, between a milking position I and a stand-by position II. In FIG. 1 the teatcups A1 are in the milking position I, while the teatcups B1 are in the stand-by position II.

A cleaning device comprises four cleaning cups 13, which are connectable to teatcups in the stand-by position II, and a cleaning apparatus 14, which is connected to the cleaning cups 13 via a cleaning conduit 15. The cleaning apparatus 14 is connectable to the milk conduit A2 between the milk filter A6 and the valve A7 via a valve 16, and to the milk conduit B2 between the milk filter B6 and the valve B7 via a valve 17.

Figure 3:
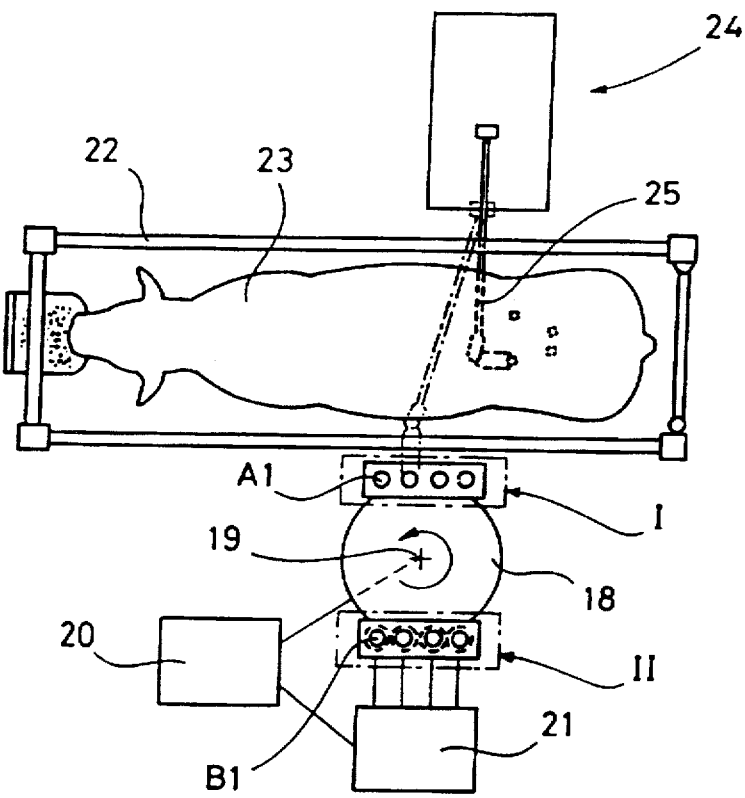
FIG. 3 is a top plan view of a stall and an automatic milking device of a milking plant of the embodiment shown in FIG. 1.

The displacement means 12 comprises a holding means 18, which carries the teatcups A1, B1 and which is rotatable about a vertical shaft 19, see FIG. 3. The teatcups A1 and B1 are arranged in respective rows on opposite sides of the shaft 19. A control unit 20 is adapted to control a device 21 for connection of the cleaning cups 13 and removal of these from teatcups which are in the stand-by position II, and to control the displacement means 12 to turn the holding means 18 180° about the shaft 19 to switch the teatcups A1, B1 between the milking position I and the stand-by position II.

In FIG. 3 there is shown the teatcups A1 in their milking position I and the teatcups B1 in their stand-by position II. The holding means 18 carries the teatcups A1 close to a stall 22, which is adapted to house one animal 23 at a time for milking of the latter. An automatic milking device 24 has an attachment means in the form of a robot arm 25, which is adapted to bring teatcups, in this case the teatcups A1, from the milking position I and attach them to the teats of the animal. For example, the robot arm 25 may be of the type disclosed in EP-B1-452 381.

The milking plant according to FIGS. 1 and 3 operates in the following manner. When the teatcups A1 are used for milking, the valves 16 and A9 are closed while the valve A7 is open, whereby extracted milk can flow through the conduit A2 via the flow meter A3, the receiver A4, the pump A5 and the milk filter A6 to the milk tank 8. If desired, the milking unit B may be cleaned simultaneously by activating the control unit 20 to control the device 21 such that the latter connects the cleaning cups 13 to the teatcups B1. Then the milk filter B6 is removed from the milk conduit B2 and the valve 17 is opened while the valve B7 is closed. The cleaning apparatus 14 supplies cleaning liquid through the cleaning conduit 15 to the cleaning cups 13. From the cleaning cups 13 the cleaning liquid is conducted via the teatcups B1, the flow meter B3, the receiver B4, the pump B5 and the valve 17 back to the cleaning apparatus 14.

When the cleaning operation is finished the milking unit B is first drained off by removing the cleaning cups 13 and opening the drain valve B9. Then a new milk filter B6 is fitted in the conduit B2 and the valves 17 and B9 are closed while the valve B7 is opened, whereby the cleaned milking unit B is ready for use.

When the milking unit A is to be cleaned the control unit 20 is activated to control the displacement means 12 to turn the holding means 18 180°, whereby the teatcups A1 are displaced to the stand-by position II while the teatcups B1 are displaced to the milking position I. Now an animal can be milked by means of the milking unit B. After the cleaning cups 13 have been connected to the teatcups A1 and the cleaning apparatus 14 has been connected to the milk conduit A2 by closing the valve A7 and opening the valve 16, and the milk filter A6 has been removed, the milking unit A can be cleaned in the corresponding manner described above for the milking unit B.

Figure 2:
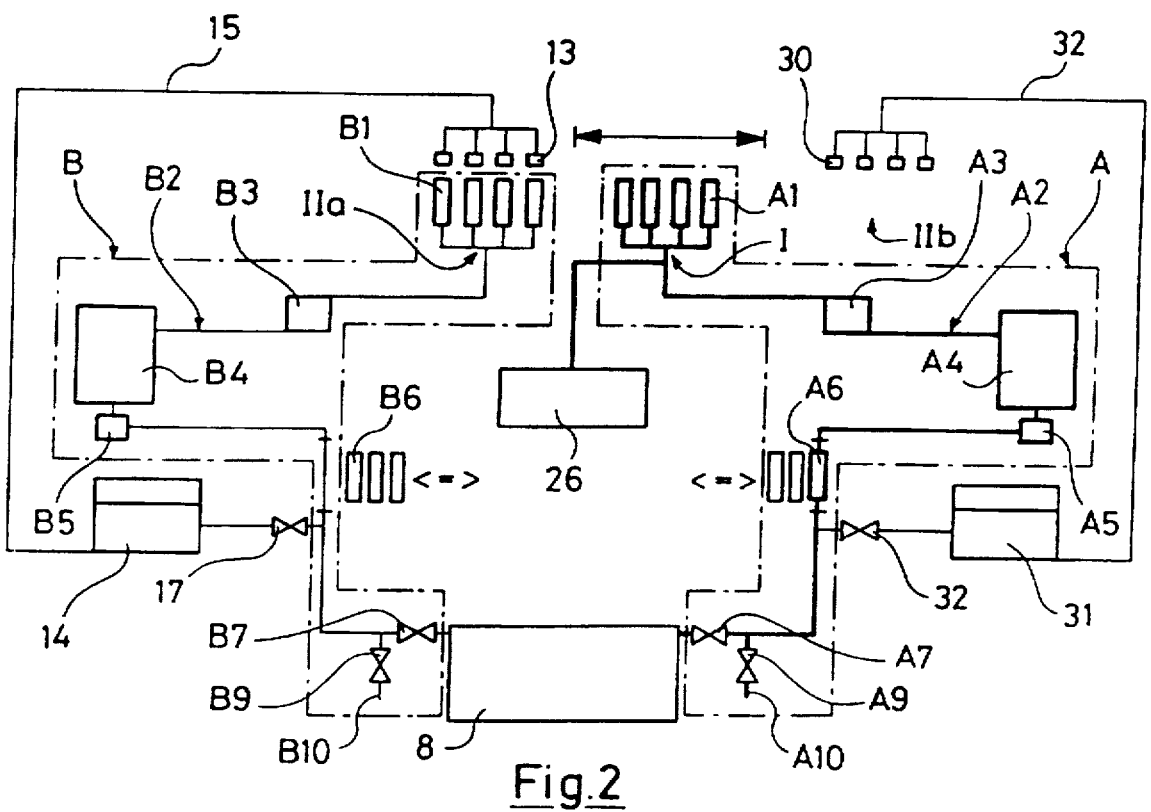
FIG. 2 is a schematic drawing showing a second embodiment of the milking plant according to the present invention.

FIG. 2 shows a milking plant which is identical to the milking plant according to FIG. 1, except that the displacement means is designed differently and that there is an additional cleaning device. Thus, the milking plant according to FIG. 2 has a displacement means 26, which comprises a holding device 27 carrying the teatcups A1 and B1 in two aligned rows, and a drive means 28, which is displaceable back and forth between two end positions along a guide rail 29 and which is rigidly connected to the holding means 27, see FIG. 4. When the drive means 28 is in one of its two end positions the teatcups A1 are in the milking position I while the teatcups B1 are in a stand-by position IIa, and when the drive means 28 is in its other end position the teat cups B1 are in the milking position I while the teatcups A1 are in a stand-by position IIb. By means of the device 21 the cleaning cups 13 are connectable to the teatcups B1, when the teatcups B1 are in their stand-by position IIa.

Said additional cleaning device comprises four cleaning cups 30, which are connectable to the teatcups A1, when these are in their stand-by position IIb, and a cleaning apparatus 31, which is connected to the cleaning cups 30 via a cleaning conduit 32. The cleaning apparatus 31 is connectable to the milk conduit A2 between the milk filter A6 and the valve A7 via a valve 32. In this case the cleaning apparatus 14 is only connectable to the milk conduit B1 via the valve 17.

A device 33 of the same kind as the device 21 is adapted to connect the cleaning cups 30 to and to remove these from the teatcups A1, when the teatcups A1 are in their stand-by position IIb. A control unit 34 is adapted to control the devices 21 and 33, and to control the drive means 28 for its displacement along the guide rail 29 between said end positions (indicated by an arrow in FIG. 4).

Figure 4:
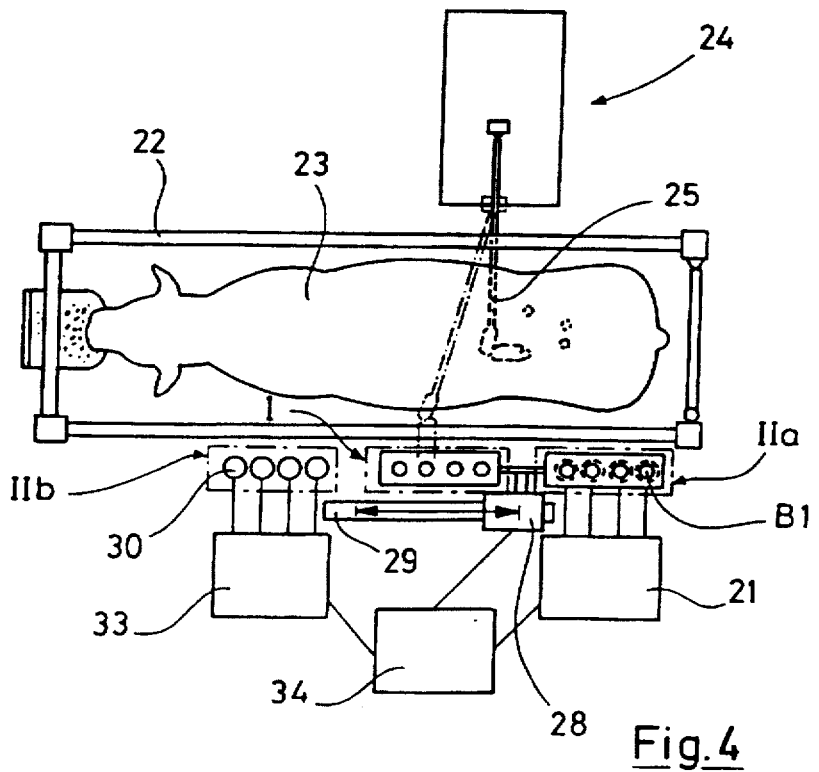
FIG. 4 is a top plan view of a stall and an automatic milking device of the milking plant of the embodiment shown in FIG. 2.

When the teatcups B1 are in their stand-by position IIa, as illustrated in FIGS. 2 and 4, the milking unit B can be cleaned by activating the control unit 34 to control the device 21 such that the cleaning cups 13 are connected to the teatcups B1. The milk filter B6 is removed from the milk conduit B2 and the valve B7 is closed while the valve 17 is opened. When the cleaning operation is finished the milking unit B is drained off and is prepared for milking in the corresponding manner described above for the milking plant according to FIGS. 1 and 3.

In case the teatcups A1 are in their stand-by position IIb and the milking unit B is utilized for milking, the milking unit A can be cleaned by activating the control unit 34 to control the device 33 such that the cleaning cups 30 are connected to the teatcups A1. The milk filter A6 is removed and the valve A7 is closed while the valve 32 is opened. When the cleaning operation is finished the milking unit B is first drained off by removing the cleaning cups 30 and opening the drain valve A9. Then a new milk filter A6 is fitted in the conduit A2 and the valves A9 and 32 are closed while the valve A7 is opened, whereby the cleaned milking unit A is ready for use.

I claim:

1. A milking plant comprising:
   a stall including structure limiting the stall to housing only one animal at a time for milking of the animal; and
   a device for automatic milking of the animal in the stall, wherein said automatic milking device comprises a first milking unit with teatcups, a second milking unit with teatcups, and an attachment means alternatively operatively connectible to each of said first and second milking units for attaching the teatcups of either the first or second milking unit to the animal's teats.

2. A milking plant according to claim 1, wherein each of said milking units has milk passages for conducting milk extracted from the animal, the milking plant further comprising cleaning means adapted to clean said milk passages of one of said first and second milking units while the teatcups of the other said milking unit are available for said attachment means.

3. A milking plant according to claim 2, wherein said cleaning means comprises a cleaning device adapted to be connected to the teatcups of one of said first and second cleaning units for cleaning of said milk passages of said one milking unit, while the teatcups of the other milking unit are available for said attachment means.

4. A milking plant according to claim 2, wherein said cleaning means comprises a first cleaning device adapted to be connected to the teatcups of the first milking unit for cleaning of said milk passages of the first milking unit, while the teatcups of the second miking unit are available for said attachment means, and a second cleaning device adapted to be connected to the teatcups of the second milking unit for cleaning of said milk passages of the second milking unit, while teatcups of the first milking unit are available for the attachment means.

5. A milking plant according to claim 1, further comprising a displacement means adapted to displace the teatcups of the first milking unit and the second milking unit, respectively, between a milking position, in which the teatcups are available for said attachment means, and a stand-by position, in which the teatcups are not available for said attachment means.

6. A milking plant according to claim 5, wherein the displacement means is adapted to simultaneously displace the teatcups of the first milking unit and the second miking unit such that the teatcups of the first milking unit are displaced from their stand-by position to their milking position while the teatcups of the second milking unit are displaced from their milking position to their stand-by position, and vice versa.

7. A milking plant according to claim 6, wherein the milking position and the stand-by position, respectively, for the teatcups of the first milking unit are the same as the milking position and the stand-by position, respectively, for the teatcups of the second milking unit.

8. A milking plant according to claim 7, wherein the displacement means comprises a holding means, which carries the teatcups of both the first and second milking units, the holding means being rotatable about a shaft for displacing the teatcups between the milking and stand-by positions.

9. A milking plant according to claim 8, wherein each milking unit has milk passages for conducting milk extracted from the animal, the milking plant further comprising cleaning means adapted to be connected to the teatcups of the first milking unit and the second milking unit, respectively, when the teatcups are in their stand-by position, for cleaning of said milk passages.

10. A milking plant according to claim 7, wherein each milking unit has milk passages for conducting milk extracted from the animal, the milking plant further comprising cleaning means adapted to be connected to the teatcups of the first milking unit and the second milking unit, respectively, when the teatcups are in their stand-by position, for cleaning of said milk passages.

11. A milking plant according to claim 6, wherein the milking position for the teatcups of the first milking unit is the same as the milking position for the teatcups of the second milking unit, whereas the stand-by positions for the teatcups of the first and second milking units are different.

12. A milking plant according to claim 11, wherein the displacement means comprises a holding means which carries the teatcups of the first and second milking units, the holding means being movable back and forth for displacing the teatcups between the milking and stand-by positions.

13. A milking plant according to claim 12, wherein each milking unit has milk passages for conducting milk extracted from the animal, the milking plant further comprising cleaning means adapted to be connected to the teatcups of the first milking unit and the second milking unit, respectively, when the teatcups are in their stand-by position, for cleaning of said milk passages.

14. A milking plant according to claim 11, wherein each milking unit has milk passages for conducting milk extracted from the animal, the milking plant further comprising cleaning means adapted to be connected to the teatcups of the first milking unit and the second milking unit, respectively, when the teatcups are in their stand-by position, for cleaning of said milk passages.

15. A milking plant according to claim 6, wherein each milking unit has milk passages for conducting milk extracted from the animal, the milking plant further comprising cleaning means adapted to be connected to the teatcups of the first milking unit and the second milking unit, respectively, when the teatcups are in their stand-by position, for cleaning of said milk passages.

16. A milking plant according to claim 5, wherein each milking unit has milk passages for conducting milk extracted from the animal, the milking plant further comprising cleaning means adapted to be connected to the teatcups of the first milking unit and the second milking unit, respectively, when the teatcups are in their stand-by position, for cleaning of said milk passages.

* * * * *